(12) United States Patent
Buehler et al.

(10) Patent No.: US 9,350,020 B2
(45) Date of Patent: May 24, 2016

(54) METAL PHOSPHATE CONTAINING MANGANESE AND METHOD FOR ITS PRODUCTION

(71) Applicant: Chemische Fabrik Budenheim KG, Budenheim (DE)

(72) Inventors: Gunnar Buehler, Nickenich (DE); Christian Graf, Dresden (DE); Andreas Jazdanian, Gross-Umstadt (DE); Kilian Schwarz, Mainz (DE); Michael Rapphahn, Frankfurt (DE)

(73) Assignee: Chemische Fabrik Budenheim KG, Budenheim (DE)

( * ) Notice: Subject to any disclaimer, the term of this patent is extended or adjusted under 35 U.S.C. 154(b) by 0 days.

(21) Appl. No.: 14/367,531

(22) PCT Filed: Dec. 21, 2012

(86) PCT No.: PCT/EP2012/076669
§ 371 (c)(1),
(2) Date: Jun. 20, 2014

(87) PCT Pub. No.: WO2013/093014
PCT Pub. Date: Jun. 27, 2013

(65) Prior Publication Data
US 2015/0108412 A1    Apr. 23, 2015

(30) Foreign Application Priority Data
Dec. 21, 2011   (DE) .......................... 10 2011 056 816

(51) Int. Cl.
*C01B 25/45*      (2006.01)
*H01M 4/58*       (2010.01)
(Continued)

(52) U.S. Cl.
CPC ........... *H01M 4/5825* (2013.01); *C01B 25/377* (2013.01); *C01B 25/45* (2013.01);
(Continued)

(58) Field of Classification Search
CPC .. H01M 4/5825; H01M 4/625; C01B 25/377; C01B 25/45; C01P 2002/52; C01P 2002/00
USPC .................................................. 252/500, 509
See application file for complete search history.

(56) References Cited

U.S. PATENT DOCUMENTS 5,910,382 A    6/1999   Goodenough et al.

FOREIGN PATENT DOCUMENTS

CA      2443725 A1    10/2002
CN    101891177 A     11/2010
(Continued)

OTHER PUBLICATIONS

Degtyarenko et al. "Synthesis of Manganese Cobalt Phosphate Dihydrates". Nov. 8, 1995. Synthesis and properties of Inorganic Compounds. Russian Journal of Inorganic Chemistry, vol. 42, No. 1, 1997, pp. 29-31.3 Total Pages.*

(Continued)

*Primary Examiner* — Mark Kopec
*Assistant Examiner* — Danny N Kang
(74) *Attorney, Agent, or Firm* — Michael L. Dunn

(57) ABSTRACT

A manganese(Mn)-bearing monometal phosphate of the type $Mn_3(PO_4)_2 \cdot 3H_2O$ or mixed-metal phosphate of the type $(Mn_x, Met_y)_3(PO_4)_2 \cdot 3H_2O$, wherein $x+y=1$ and Met represents one or more metals selected from Fe, Co, Ni, Sc, Ti, V, Cr, Cu, Zn, Be, Mg, Ca, Sr, Ba, Al, Zr, Hf, Re, Ru, La, Ce, Pr, Nd, Sm, Eu, Gd, Tb, Dy, Ho, Er, Tm, Yb and Lu, characterized in that in the X-ray powder diffraction diagram the phosphate has peaks at 10.96±0.05, 12.78±0.17, 14.96±0.13, 17.34±0.15, 18.98±0.18, 21.75±0.21, 22.07±0.11, 22.97±0.10, 25.93±0.25, 26.95±0.30, 27.56±0.10, 29.19±0.12, 29.84±0.21, 30.27±0.12, 34.86±0.21, 35.00±0.20, 35.33±0.30, 35.58±0.10, 35.73±0.12, 42.79±0.45, 43.37±0.45, 44.70±0.15 and 44.93±0.20 degrees two-theta, based on $CuK_\alpha$-radiation.

20 Claims, 7 Drawing Sheets

X-ray powder diffraction diagram of the product of Example 4 with $CuK_\alpha$-radiation

(51) Int. Cl.
*C01B 25/37* (2006.01)
*H01M 4/62* (2006.01)

(52) U.S. Cl.
CPC .......... *H01M 4/625* (2013.01); *C01P 2002/52* (2013.01); *C01P 2002/54* (2013.01); *C01P 2002/72* (2013.01); *C01P 2002/77* (2013.01); *C01P 2004/04* (2013.01); *C01P 2004/20* (2013.01); *C01P 2004/32* (2013.01); *C01P 2004/40* (2013.01)

(56) References Cited

FOREIGN PATENT DOCUMENTS

| CN | 102205955 A | 10/2011 |
|---|---|---|
| DE | 102009001204 A1 | 9/2010 |
| JP | 2004063270 A | 2/2004 |
| SU | 539831 A1 | 2/1977 |
| UA | 70214 A | 9/2004 |
| WO | 9740541 A1 | 10/1997 |
| WO | 0060680 A1 | 10/2000 |
| WO | 02099913 A1 | 12/2002 |
| WO | 2011092283 A1 | 8/2011 |

OTHER PUBLICATIONS

Corresponding CN App. No. 201280063651.4 Office Action dated Jun. 23, 2015.

Degtyarenko, L.N. and Antrapseva, N.M.: "Synthesis of manganese cobalt phosphate trihydrates", Russian Journal of Inorganic Chemistry, Bd. 42, Nr. 1, 1997, Seiten 29-31, XP008160642, ISSN: 0044-457X, das ganze Dokument.

\* cited by examiner

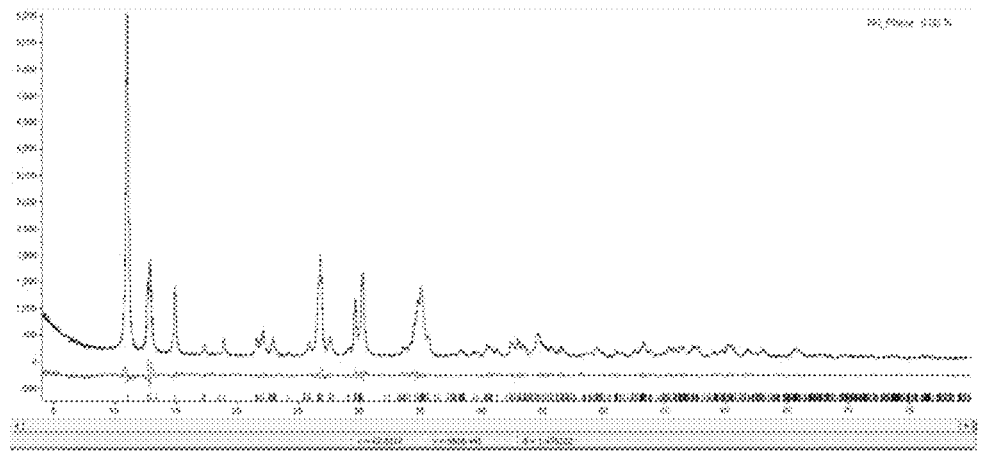
Figure 1: X-ray powder diffraction diagram of the product of Example 4 with CuK$_\alpha$-radiation
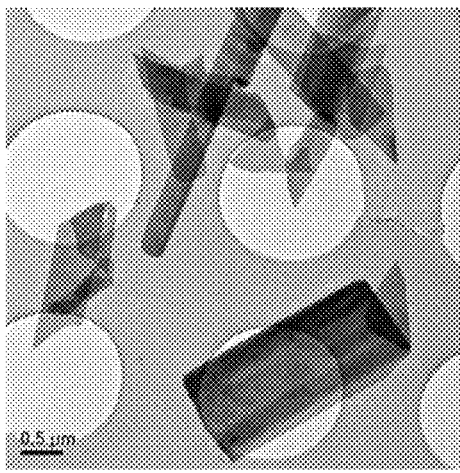
Figure 2: Transmission electron microscopic recording (TEM) of individual platelet-form crystals of the product of Example 4

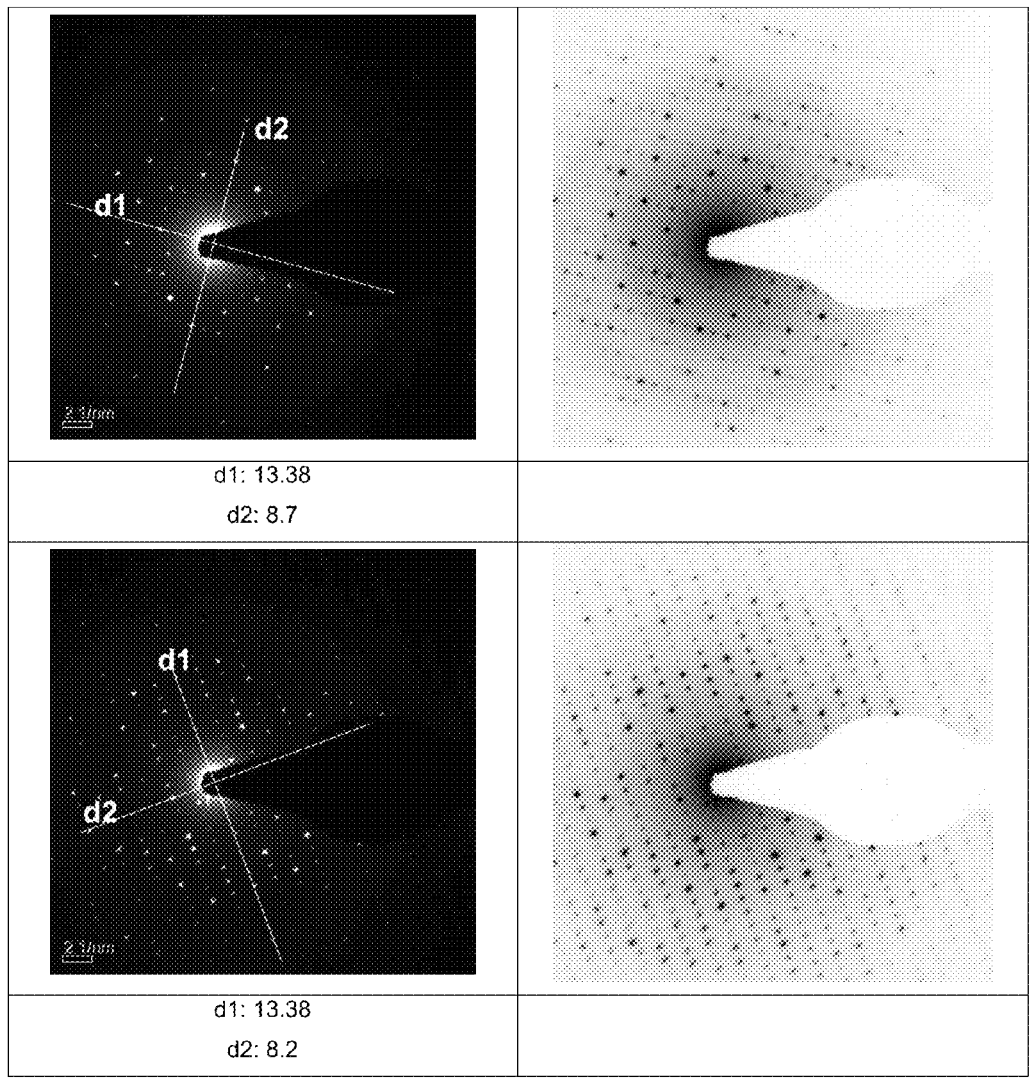
Figure 3: Electron diffraction images from TEM investigations of individual platelet-form crystals of the product of Example 4

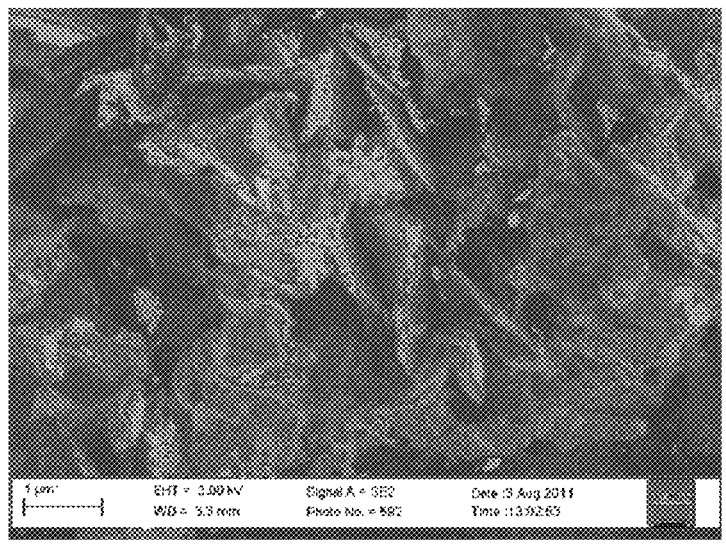
Figure 4: Electron microscope recording of the product of Example 1
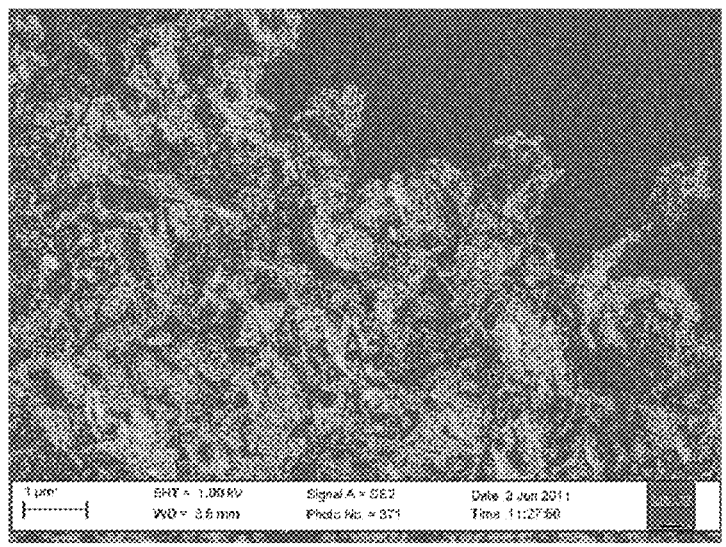
Figure 5: Electron microscope recording of the product of Example 3

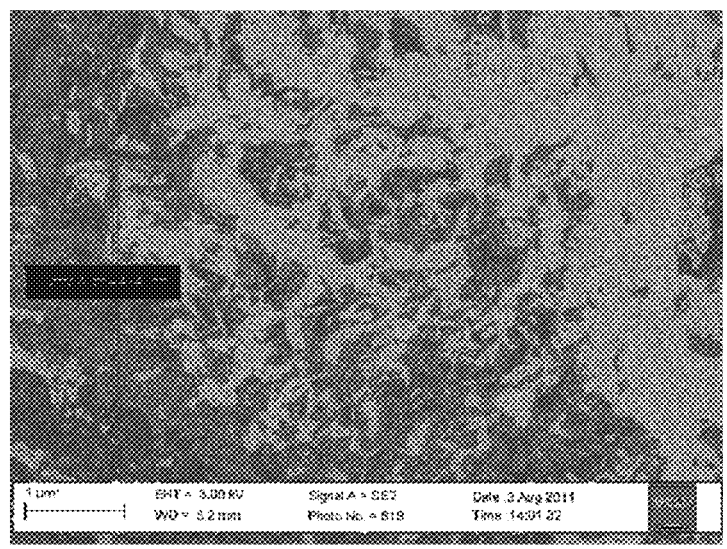
Figure 6: Electron microscope recording of the product of Example 18

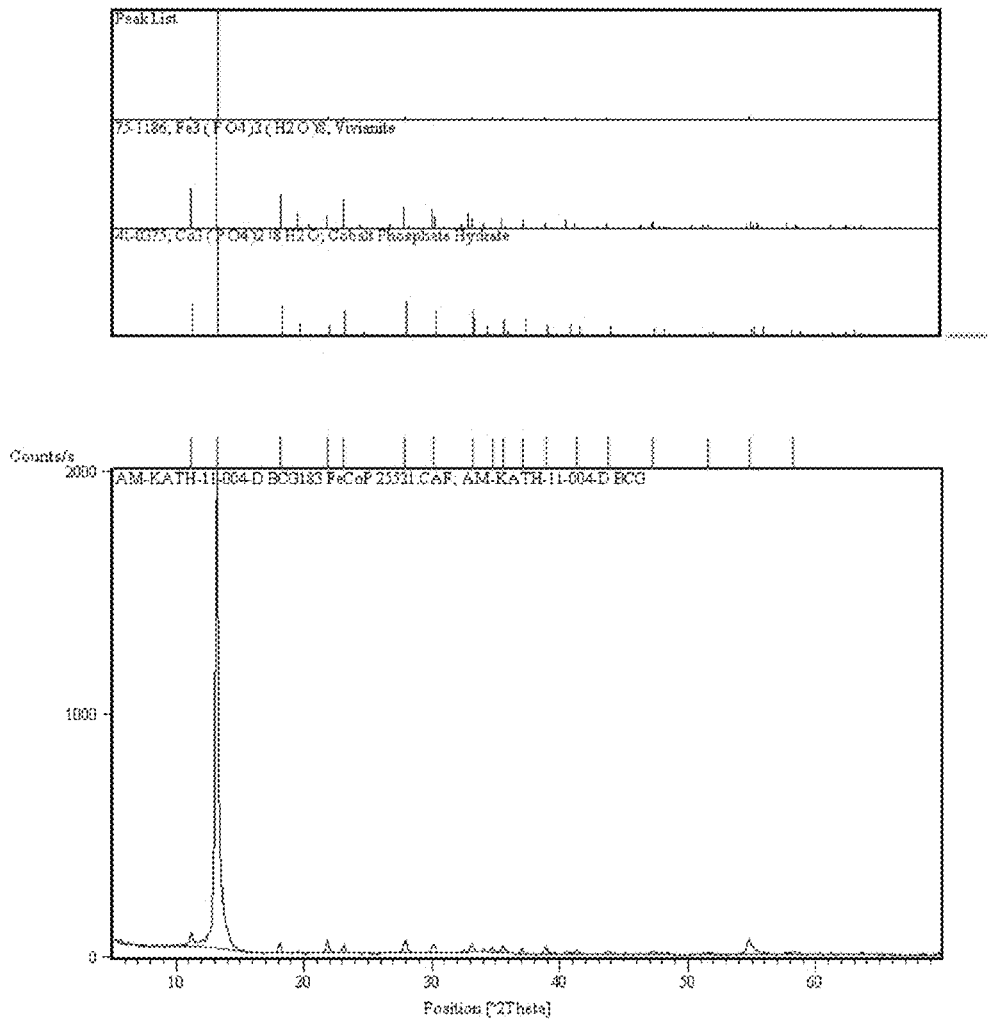
Figur 7: X-ray powder diffraction diagram of the product of Example 17 with CuK$_\alpha$-radiation, which can be completely indexed in accordance with PDF 75-1186 (Fe$_3$(PO$_4$)$_2$ x 8 H$_2$O) and 41-0375 (Co$_3$(PO$_4$)$_2$ x 8 H$_2$O)

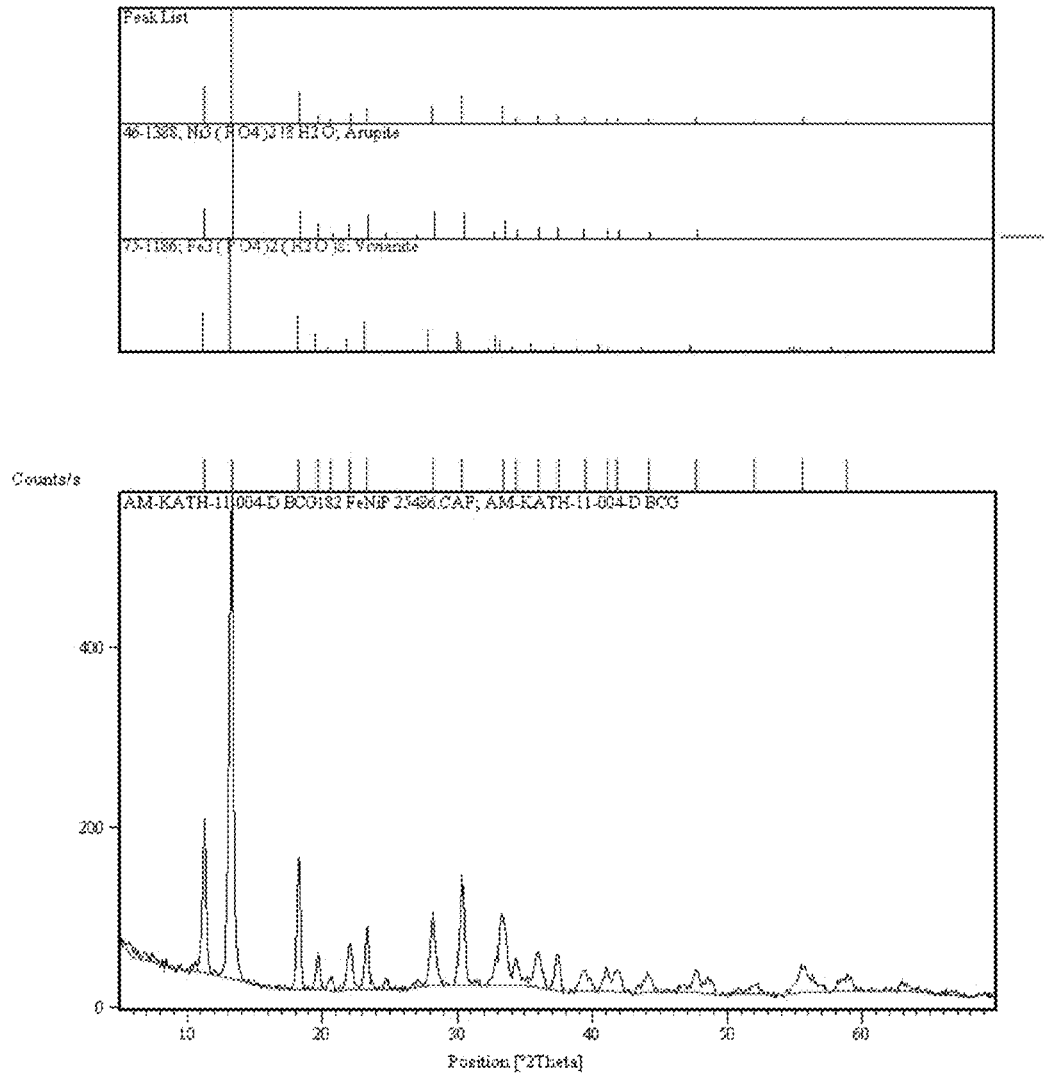
Figure 8: X-ray powder diffraction diagram of the product of Example 16 with $CuK_\alpha$-radiation, which can be completely indexed in accordance with PDF 75-1186 ($Fe_3(PO_4)_2 \times 8\ H_2O$) and 46-1388 ($Ni_3(PO_4)_2 \times 8\ H_2O$)

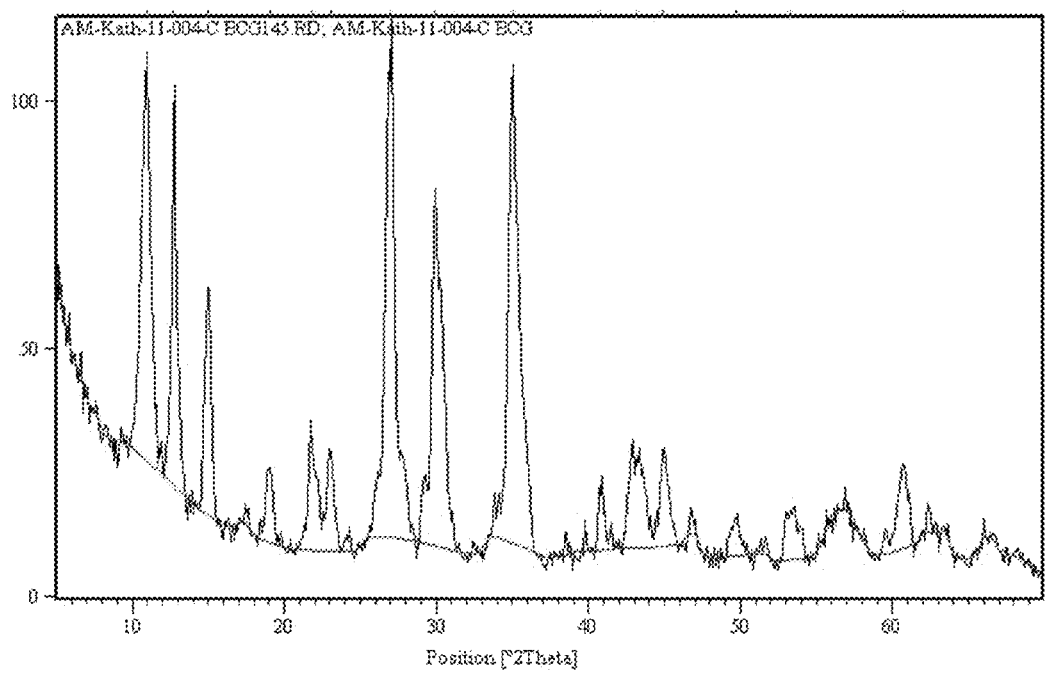
Figur 9: X-ray powder diffraction diagram of the product of Example 3 with $CuK_\alpha$-radiation

METAL PHOSPHATE CONTAINING MANGANESE AND METHOD FOR ITS PRODUCTION

CROSS REFERENCE TO RELATED APPLICATIONS

This application is a nationalization of International Application PCT/EP2012/076669 filed Dec. 21, 2012 and claims priority from German Application DE 102011056816.6 filed Dec. 21, 2011 both of which are incorporated by reference.

BACKGROUND OF THE INVENTION

This invention relates to magnesium bearing metal phosphates.

Rechargeable Li-ion accumulators are wide-spread energy storage means, particularly in the field of mobile electronics. Lithium metal oxides such as for example $LiCoO_2$, $LiNiO_2$, $LiNi_{1-x}Co_xO_2$ and $LiMn_2O_4$ have established themselves as cathode materials. Besides the oxides, lithium-bearing phosphates with an olivine structure such as for example $LiFePO_4$ (LFP) have also been developed, which are suitable as cathode materials. Those materials are distinguished by good power output, high specific capacitance and very high stability.

Besides LFP there are further lithium-bearing phosphates which are discussed as commercially usable cathode materials such as for example $LiMnPO_4$, $LiCoPO_4$ or $LiNiPO_4$. In addition mixed-metal compounds of the type $LiA_xB_yC_zPO_4$ ((x+y+z)=1) are also discussed such as for example alloys of $LiNiPO_4$ and $LiCoPO_4$ in the form of $LiNi_xCo_{x-1}PO_4$ or $LiFe_xMn_{1-x}PO_4$.

In particular $LiFe_xMn_yPO_4$ and $LiFe_xMn_yM_zPO_4$ (LFMP), wherein M is a metal cation like for example Mg are discussed as suitable compounds for replacing pure $LiFePO_4$ (LFP) in cathode materials. Because of the higher working voltage of manganese- or nickel- or cobalt-bearing compounds in relation to iron-bearing olivines it is possible to achieve a higher level of energy storage density.

DE 10 2009 001 204 describes a process for producing crystalline iron(III) orthophosphate dihydrate (FOP) with phosphosiderite or metastrengite II-crystal structure which by virtue of the production process and the material properties is highly suitable as a precursor compound for the production of LFP in accordance with processes described in the literature.

WO 97/40541, U.S. Pat. No. 5,910,382 and WO 00/60680 describe the production of lithium mixed-metal phosphates, wherein generally firstly physical mixtures of various metal salts or also metalorganic compounds are produced, which in a subsequent step are calcined with conventional methods of solid-body synthesis at high temperatures and possibly with atmosphere control. In most cases in that respect the starting compounds are broken down in such a way that only the desired ions for construction of the target compound remain in the reaction system.

To achieve ideal isotropic distribution of the various cations in a crystal matrix, generally, in thermal processes as in calcination, a sufficiently high level of energy must be introduced into the reaction system to ensure efficient ion diffusion. In general intensive mixing of all the raw materials used is carried out as a preliminary step to reduce the amount of energy and time involved. In particular dry- or wet-mechanical processes, for example ball mills, are suitable for mixing the raw materials. That however results in mechanical mixtures of particles or crystals of various metal salts. In the subsequent calcination operation it is therefore necessary to ensure that the ions necessary for constructing the desired crystal phase diffuse beyond the primary crystal grain boundaries. Temperatures over 700 to 800° C. and calcination times over 15 hours are usually required for that purpose. It is also usual for the physical mixtures to be initially subjected to a heating step at lower temperatures (300-400° C.) to bring about initial breakdown. Those intermediate products are then comminuted once again and intensively thoroughly mixed in order to achieve good results overall in the sense of phase purity, crystallinity and homogeneity. The known thermal processes are therefore energy- and time-intensive.

In addition particularly high purity demands are made on the starting materials used for the production of cathode materials for lithium-ion batteries as all constituents and impurities which do not break down remain in the reaction system and thus in the product. Upon the breakdown of cations and anions of the metal compounds used as starting materials (for example $NH_4^+$, $C_2O_4^{2+}$, $(CH_3)(CH_2)_nCOO^-$, $CO_3^{2-}$, etc), gases are also produced, which must be treated in the exhaust gas flow in an expensive and complicated procedure because of potentially dangerous properties (for example CO, $NH_3$, $NO_x$, etc).

CA 02443725 describes the production of LiXYPO4 (X, Y=metal, for example Fe, Mn etc) using iron sulphate, manganese sulphate and lithium phosphate and additionally lithium hydroxide as starting materials, from which firstly a solid substance mixture which is not characterised in fuller detail is produced, which is then converted into the desired product by a calcination step at 300 to 1000° C.

Introducing given metals in the form of their sulphates in an equimolar amount in relation to the phosphate usually requires the product to be subjected to an intensive washing process to reduce the sulphate content to a tolerable amount. By virtue of the corrosive action it is known that sulphate is an unwanted impurity in lithium-ion batteries. Due to an intensive washing process however lithium can also be removed from the product in a considerable amount as only trilithium orthophosphate has a very low level of solubility among the lithium orthophosphates. If the product in CA 02443725 is subjected to such a washing process, it is to be assumed that lithium is washed out. However CA 02443725 does not mention a washing process, which in turn would result in a high level of sulphate contamination in the product.

In principle it is possible to achieve quite homogeneous cation distribution levels by hydro- or solvothermal processes if the levels of solubility and complexing constants or the crystalline growth factors of the introduced cations and anions can be so controlled and adjusted by way of the reaction procedure in the selected matrix that only the desired species is produced in isolatable form. In many cases surface-active substances or also additives which promote the formation of a given crystal phase or growth in a preferred direction, so-called templates which are known to the man skilled in the art, are used here to control crystal growth. In those processes, operation is often implemented in closed systems beyond the boiling point of the reaction matrix, whereby very high pressures are involved. That places high demands on the reactor technology. In many cases the products obtained have to be nonetheless or additionally subsequently calcined to ensure the necessary crystallinity. The surface-active additives must be quantitatively removed in order not to cause any negative influences in the subsequent use. That is also achieved by heating, in which case those substances burn or char/soot.

Processes operating in a pressure-less mode are also described, wherein the crystallisation times of the desired products are always specified as being several days to weeks. That casts doubt on profitability in commercial use.

BRIEF SUMMARY OF THE INVENTION

An object of the present invention is to provide novel monometal or mixed-metal phosphates which are suitable for example for the production of cathode materials for lithium-ion batteries, in particular those with which cathode materials with high energy storage density levels can be produced, and a process for producing same, which is comparatively energy-efficient and simple and with which the phosphates can be produced in a high level of purity so that in comparison with the state of the art they are better suited for example as precursor compounds (precursors) for the production of lithiated cathode materials for lithium-ion batteries.

The phosphate is preferably a novel manganese (Mn)-bearing monometal phosphate of the type $Mn_3(PO_4)_2.3H_2O$ or mixed-metal phosphate of the type $(Mn_x, Met_y)_3(PO_4)_2.3H_2O$, wherein x+y=1 and Met represents one or more metals selected from Fe, Co, Ni, Sc, Ti, V, Cr, Cu, Zn, Be, Mg, Ca, Sr, Ba, Al, Zr, Hf, Re, Ru, La, Ce, Pr, Nd, Sm, Eu, Gd, Tb, Dy, Ho, Er, Tm, Yb and Lu. The invention further concerns a process for producing the phosphate and its use. More particularly, an object of the invention is attained by a manganese(Mn)-bearing monometal phosphate of the type $Mn_3(PO_4)_2.3H_2O$ or mixed-metal phosphate of the type $(Mn_x, Met_y)_3(PO_4)_2.3H_2O$, wherein x+y=1 and Met represents one or more metals selected from Fe, Co, Ni, Sc, Ti, V, Cr, Cu, Zn, Be, Mg, Ca, Sr, Ba, Al, Zr, Hf, Re, Ru, La, Ce, Pr, Nd, Sm, Eu, Gd, Tb, Dy, Ho, Er, Tm, Yb and Lu, characterised in that in the X-ray powder diffraction diagram the phosphate has peaks at 10.96±0.05, 12.78±0.17, 14.96±0.13, 17.34±0.15, 18.98±0.18, 21.75±0.21, 22.07±0.11, 22.97±0.10, 25.93±0.25, 26.95±0.30, 27.56±0.10, 29.19±0.12, 29.84±0.21, 30.27±0.12, 34.86±0.21, 35.00±0.20, 35.33±0.30, 35.58±0.10, 35.73±0.12, 42.79±0.45, 43.37±0.45, 44.70±0.15 and 44.93±0.20 degrees two-theta, based on $CuK_\alpha$-radiation.

The invention also concerns a process for producing a manganese(Mn)-bearing monometal phosphate of the type $Mn_3(PO_4)_2.a\ H_2O$ or mixed-metal phosphate of the type $(Mn_x, Met_y)_3(PO_4)_2.a\ H_2O$, wherein x+y=1, a=0 to 9 and Met represents one or more metals selected from Fe, Co, Ni, Sc, Ti, V, Cr, Cu, Zn, Be, Mg, Ca, Sr. Ba, Al, Zr, Hf, Re, Ru, La, Ce, Pr, Nd, Sm. Eu, Gd, Tb, Dy, Ho, Er, Tm, Yb and Lu, wherein the process is characterised in that a) an aqueous solution (I) is produced, which contains at least divalent manganese cations ($Mn^{2+}$) and optionally one or more of the metals Fe, Co and/or Ni as divalent cations, by introducing oxidic metal(II)-, metal(III)- and/or metal(IV) compounds or their mixtures or compounds with mixed oxide stages selected from hydroxides, oxides, oxide-hydroxides, oxide-hydrates, carbonates and hydroxide carbonates, of at least one of the metals Mn, Fe, Co and/or Ni together with the elementary forms or alloys of at least one of the metals Mn, Fe, Co and/or Ni into an aqueous medium containing phosphoric acid, and reacting the oxidic metal compounds with the elementary forms or alloys of the metals (in a redox reaction) to give the divalent metal ions, wherein at least one of the oxidic metal compounds and/or at least one of the elementary forms or alloys of metal includes manganese, b) possibly contained solid substances are separated from the phosphoric-acid aqueous solution (I), c) if the phosphate is a mixed-metal phosphate and in addition to the metals introduced into the solution in stage a) contains further metals selected from Met in addition at least one compound of at least one of the metals Met is added to the aqueous solution (I) in the form of an aqueous solution or in the form of a solid substance in the form of a salt, wherein the at least one compound is preferably selected from hydroxides, oxides, oxide-hydroxides, oxide-hydrates, carbonates, hydroxide carbonates, carboxylates, sulphates, chlorides or nitrates of the metals, d) a receiver solution (II) with a pH-value of 5 to 8 and produced from an aqueous phosphoric acid solution by neutralisation with an aqueous alkali hydroxide solution or produced from an aqueous solution of one or more alkali phosphates is provided, e) the aqueous solution (I) is meteredly added to the receiver solution (II) and at the same time a basic aqueous alkali hydroxide solution is meteredly added in such a way that the pH-value of the resulting reaction mixture is kept in the region of 5 to 8, preferably 6 to 7, wherein the phosphate of type $Mn_3(PO_4)_2.a\ H_2O$ or $(Mnx, Met_y)_3(PO4)_2.a\ H_2O$ is precipitated, and f) the precipitated phosphate is separated from the reaction solution.

BRIEF DESCRIPTION OF THE SEVERAL VIEWS OF THE DRAWINGS

FIG. 1 shows an X-ray powder diffraction diagram of the product of Example 4 with $CuK_\alpha$-radiation;

FIG. 2 shows a transmission electron microscopic recording (TEM) of individual platelet-form crystals of the product from Example 4;

FIG. 3 shows electron diffraction images from TEM investigations of individual platelet-form crystals of the product from Example 4;

FIG. 4 shows an electron microscope recording of the product of Example 1;

FIG. 5 shows an electron microscope recording of the product of Example 3;

FIG. 6 shows an electron microscope recording of the product of Example 6;

FIG. 7 shows an X-ray powder diffraction diagram of the product of Example 17 with $CuK_\alpha$-radiation, which can be completely indexed in accordance with PDF 75-1186 ($Fe_3(PO_4)_2 \times 8\ H_2O$) and 41-0375 ($Co_3(PO_4)_2 \times 8\ H_2O$);

FIG. 8 shows an X-ray powder diffraction diagram of the product of Example 16 with $CuK_\alpha$-radiation, which can be completely indexed in accordance with PDF 75-1186 ($Fe_3(PO_4)_2 \times 8\ H_2O$) and 46-1388 ($Ni_3(PO_4)_2 \times 8\ H_2O$);

FIG. 9 shows an X-ray powder diffraction diagram of the product of Example 3 with $CuK_\alpha$-radiation.

DETAILED DESCRIPTION OF THE INVENTION

The manganese(Mn)-bearing phosphate according to the invention has a novel structure type characterised by its peak positions in the X-ray powder diffraction diagram. The novel structure type is also referred to herein as '$Mn_3(PO_4)_2.3H_2O$ structure type'. That structure type is not known in the literature. It can be obtained both in the form of a monometal phosphate of type $Mn_3(PO_4)_2.3H_2O$ and also as a mixed-metal phosphate of the type $(Mn_xMet_y)_3(PO_4)_2.3H_2O$ with the above-mentioned characteristic peak positions in the X-ray powder diffraction diagram. In that respect the individual peaks, in dependence on the composition of the metal constituents, may be subject to slight displacements within an angle range specified by '±', in degrees two-theta.

The manganese(Mn)-bearing phosphate according to the invention of the new structure type preferably has an orthorhombic elementary cell with lattice parameters of 13.2+/−0.2; 8.6+/−0.2 and 8.1+/−0.2 Angström.

In a preferred embodiment of the invention the manganese (Mn)-bearing phosphate is present in the form of a carbon composite and contains 1 to 10% by weight of carbon, preferably 1.5 to 5% by weight of carbon, particularly preferably 1.8 to 4% by weight of carbon, with respect to the total weight of phosphate and carbon.

Such phosphate-carbon composites are obtained by the addition of a carbon source during production of the phosphate according to the invention, which is described in detail hereinafter in relation to the process according to the invention. The inclusion of carbon in the product according to the invention permits electrically conductive implementation of the material per se and/or of the products which can be produced from the material, for example cathode materials for lithium-ion accumulators. The amount and nature of the carbon source, added in the course of production, makes it possible to freely adjust the resulting carbon content and thus conductivity within certain limits. An excessively high carbon content has the disadvantage that the maximum possible amount of active cathode material is reduced in a later use in lithium-ion batteries. With a carbon content below 1% by weight, an adequate increase in conductivity is no longer achieved.

In a further preferred embodiment of the invention the manganese(Mn)-bearing phosphate has a platelet-shaped morphology, preferably with a platelet thickness (=smallest spatial extent) in the region of 10 to 100 nm, preferably in the region of 20 to 70 nm, particularly preferably in the region of 30 to 50 nm.

The platelet-shaped morphology preferred according to the invention has particular advantages for example in use of the phosphate according to the invention for the production of lithiated (Li-bearing) cathode material for Li-ion accumulators. The platelet form with nanoscale platelet thickness of the primary crystallites ensures in that respect the shortest possible diffusion paths and diffusion times in the lithiation operation by way of simple and inexpensive calcination processes. The ideally isotropic distribution of the metal ions, which is present in the material according to the invention, also reduces the necessary calcination temperatures and times as no metal ion diffusion beyond grain boundaries is necessary. The defined crystallite structure ensures clearly defined and reproducible reaction paths in the calcination operation and in the production of cathode materials.

In a further preferred embodiment of the invention the manganese(Mn)-bearing phosphate is a mixed-metal phosphate of the type $(Mn_xMet_y)_3(PO_4)_2 \cdot 3H_2O$, in which the ratio of Mn:(Mn+Met)=x: (x+y)≥0.15, preferably ≥0.4, particularly preferably ≥0.5. The ratio of Mn:(Mn+Met) denotes the atomic ratio of manganese to the sum of all metals contained according to the invention including manganese. In the formula notation $(Mn_xMet_y)_3(PO_4)_2 \cdot 3H_2O$ with x+y=1 the ratio of Mn:(Mn+Met) can also be expressed by x:(x+y). In a monometal phosphate according to the invention the ratio is x:(x+y)=1 as in that case y=0. With an excessively low proportion of manganese in the mixed-metal phosphate the novel '$Mn_3(PO_4)_2 \cdot 3H_2O$ structure type' cannot be obtained.

In the process, the metals introduced into the solution (I) in stage a) are also referred to herein as 'primary metals'. The primary metals include at least manganese (Mn) and optionally Fe, Co and/or Ni. The metals optionally introduced into the solution in stage c) and selected from Fe, Co, Ni. Sc, Ti, V, Cr, Cu, Zn, Be, Mg, Ca, Sr, Ba, Al, Zr, Hf, Re, Ru, La, Ce, Pr, Nd, Sm, Eu, Gd, Tb, Dy, Ho, Er, Tm, Yb and Lu are also referred to herein as 'doping metals'. Further manganese (Mn) can also be introduced in stage c). The doping metals can occur in the solution in the form of the divalent metal ions, but they can also be present in the solution in the form of the trivalent or tetravalent metal ions. Some of the doping metals are preferably present in the trivalent form. If the phosphate according to the invention is further processed for example to give a cathode material then those metal ions which are not divalent represent quasi-dislocations in the structure, which can advantageously influence the performance of the cathode material.

The process according to the invention for producing a monometal or mixed-metal phosphate is simple and inexpensive in comparison with the state of the art. A further advantage of the process according to the invention is that the aqueous phosphoric-acid solution (I) only contains the desired metal cations and exclusively or predominantly phosphate anions or phosphoric acid. There is thus no need for an expensive operation for removing foreign anions like sulphates, nitrates, chlorides or others, in the further course of producing the products according to the invention. If in stage c) of the process according to the invention doping metals are introduced for example in the form of their sulphates, nitrates or chlorides, that is effected in small amounts which are still acceptable in the product to be produced and do not adversely affect the product properties or affect them only to a reasonable degree. The phosphates according to the invention thus enjoy high purity whereby they are particularly suitable for example for the production of lithiated cathode materials. Lithiation can be effected by a simple thermal reaction step (calcination), in which case here a suitable lithium salt has to be added depending on the respective nature of the phosphate material.

The process according to the invention makes available an extremely flexible reaction principle with which it is possible to represent a large number of phosphate systems of the kind described herein, for example (pseudo)binary, (pseudo)ternary and (pseudo)quaternary systems.

The process according to the invention affords the option of controlling certain material parameters like crystal phase and cation distribution, morphology, crystallite and secondary particle size as well as the chemical purity of the products obtained by suitable selection of the precipitation conditions like pH-value, levels of concentration, temperature and so forth. In that case preferred products are the above-described products with platelet-shaped morphology, which have a unitary crystal phase and an isotropic distribution of the cations.

In the first reaction stage of the process according to the invention the oxidic metal(II)-, metal(III)- and/or metal(IV)-compounds are reacted with elementary metal or alloys in a phosphoric-acid aqueous medium in a redox reaction to give the divalent metal ions. The progress of the described redox reaction between the elementary metals and the oxidic components depends on their respective specific surface areas as electron transfer takes place at the interface. The formation of hydrogen gas is to be taken into consideration as a concurrent secondary reaction in relation to the transfer of electrons from the elementary metal forms to the oxidic metal forms. This involves the electron transfer from the elementary metal forms to protons with the formation of radicals which form hydrogen gas by radical combination. The particle sizes of the elementary and oxidic metal forms used should therefore be matched to each other to repress the secondary reaction and to reap the greatest possible benefit from the dissolution of the inexpensive oxidic metal form. In general terms, the finer the elementary metal form is, the correspondingly more is the secondary reaction promoted if the oxidic form does not offer a sufficiently high active surface.

Depending on the respective composition of the reaction solution unreacted components can remain as solid residues in the solution. If solid substances are still contained in the resulting reaction solution, they are preferably separated from the phosphoric-acid aqueous solution. The separation of solid substances can be carried out using all suitable known methods of separating liquids and solids, for example filtration, centrifuging, sedimentation and so forth.

If the phosphate to be produced according to the invention is a mixed-metal phosphate and in addition to the metals introduced into the solution in stage a), contains further metals selected from Met, at least one compound of at least one of the metals selected from Met, optionally also manganese, in the form of an aqueous solution or as a solid in the form of a salt, is added to the aqueous solution (I) prior to the metered addition to the receiver solution (II) in stage e), wherein the at least one compound is preferably selected from hydroxides, oxides, oxide-hydroxides, oxide-hydrates, carbonates, hydroxide carbonates, carboxylates, sulphates, chlorides or nitrates of the metals. The addition of those doping metals is preferably effected in stage c) of the process, after possibly included solid substances have been separated from the phosphoric-acid aqueous solution (I). Alternatively the described addition of the doping metals can also be effected immediately after production of the solution (I) in stage a) and prior to separation of possibly included solid substances. Separation of possibly included solid substances is then effected following the addition of the doping metals.

The addition of suitable metal salts (doping metals) in the stated form makes it possible to very accurately adjust the desired metal content or the ratio of the metals to each other in the phosphate to be produced. That applies in particular to metals which are used in a comparatively small amount. Desirably, metal compounds should be introduced, which in the further course of the procedure do not introduce troublesome anions into the mixture in order to ensure a very high degree of product purity. They are in particular hydroxides, oxides, oxide-hydroxides, oxide-hydrates, carbonates and hydroxide carbonates which under the prevailing acid conditions react or break down with the formation of water. If necessary buffers which are familiar to the man skilled in the art can be used to prevent unwanted premature or uncontrolled precipitation. Carboxylates are also suitable as proportions remaining in the mixture of organic acids generally break down upon later calcination of the products. The addition of the metals in the form of their sulphates, chlorides or nitrates can also be suitable for doping metals if in that way the content of sulphates, chlorides or nitrates in the product does not exceed certain limit values which are still considered acceptable for the respective application.

The receiver solution (II) for subsequent precipitation of the phosphates according to the invention is also a phosphate solution with a pH-value buffered in the region of 5 to 8. The receiver solution is either produced from an aqueous phosphoric-acid solution by neutralisation with an aqueous alkali hydroxide solution or directly from an aqueous solution of one or more alkali phosphates. The aqueous solution (I) is meteredly added to the receiver solution (II) for precipitation of the phosphates according to the invention. In that respect, because of the low pH-value of the phosphoric-acid solution (I), a basic aqueous alkali hydroxide solution is meteredly added at the same time to keep the pH-value of the resulting reaction mixture in the region of 5 to 8. An excessively low pH-value of the receiver solution (II) or of the resulting reaction mixture, below a pH-value of 5, has the disadvantage that, besides the desired crystal phase according to the invention, further crystal phases can also be formed, for example metal hydrogen or metal dihydrogen phosphates. An excessively high pH-value of the receiver solution (II), above a pH-value of 8, has the disadvantage that traces of metal hydroxides can be formed, which represent unwanted contamination in the products according to the invention. Preferably the basic aqueous alkali hydroxide solution is meteredly added in such a way that, upon metered addition of the solution (I) in the reaction mixture there is a pH-value in the region of 6 to 7. That has the advantage that exclusively the crystal phase according to the invention is formed.

After precipitation of the phosphate according to the invention it is separated from the reaction solution. That is also once again effected using per se known processes, for example filtration, centrifuging, sedimentation etc. The phosphate separated from the reaction solution is then desirably dried, that is to say water is removed therefrom. Drying can be effected selectively in ambient atmosphere, in a protective gas atmosphere and/or under reduced pressure and/or at elevated temperature (above room temperature, 25° C.). The processes suitable for that purpose are familiar to the man skilled in this art and do not need to be described in greater detail. As a supplemental consideration attention is directed to the examples hereinafter. In the drying operation free water is removed from the residue separated from the reaction solution. Depending on the desired product however bound water of crystallisation is also removed by the drying operation, to a desired hydrate stage of the product.

In a preferred embodiment of the invention the precipitated phosphate separated from the reaction solution is dried to a hydrate stage $Mn_3(PO_4)_2 \cdot a\, H_2O$ or $(Mn_xMet_y)_3(PO_4)_2 \cdot a\, H_2O$ with $0 \leq a \leq 9$, particularly preferably with a 0, 3 or 7, quite particularly preferably with a=3. The hydrate stage with a=3 has the novel structure type according to the invention. It is stable over a wide temperature range. The hydrate stages with a=0 and a=7 are also sufficiently stable.

In a preferred embodiment the manganese(Mn)-bearing phosphate produced by the process according to the invention is a mixed-metal phosphate which besides manganese (Mn), contains at least one further metal (Met), wherein the phosphate contains preferably no more than 7 different metals. In most cases a mixed-metal phosphate of the kind according to the invention is desirably produced, having two, three or four different metals. It is frequently desirable to produce a mixed-metal phosphate which, besides manganese (Mn), has one or two different metals selected from Fe, Co and Ni, in high proportions, as so-called primary metals, and/or one or more metals in respectively small proportions, as so-called doping metals. For example a phosphate according to the invention containing manganese as the primary metal can advantageously have a small proportion of a further metal, for example Mg, Al, Cu and/or a lanthanoid metal, as is demonstrated in the examples hereinafter.

Particularly preferably the manganese(Mn)-bearing mixed metal phosphate in relation to all contained metals contains at least 40 atomic % Mn, preferably at least 60 atomic % Mn, particularly preferably at least 80 atomic % Mn, quite particularly preferably at least 90 atomic % Mn.

In an alternative preferred embodiment the manganese (Mn)-bearing phosphate produced by the process according to the invention is a monometal phosphate which besides impurities due to the process involved contains only manganese (Mn) as the metal.

The process according to the invention has considerable advantages, in particular in the production of mixed-metal phosphates, over the state of the art, in terms of efficiency, process costs, energy consumption and achievable product purity. In addition the proportions of the various metals in the mixed-metal phosphate can be very easily and accurately adjusted. Furthermore the process according to the invention makes it possible, by a suitable choice of the precipitation conditions such as pH-value, levels of concentration, temperature and so forth, to control certain material parameters like crystal phase and cation distribution, morphology, crystallite and secondary particle size and the chemical purity of the products obtained. That is not possible or is only limitedly possible with the known processes in which metal phosphates and other metal salts are mixed and then thermally reacted by calcination, and generally entails a substantially higher level of energy involvement.

Particularly preferably the manganese(Mn)-bearing phosphate produced according to the invention has the novel 'Mn$_3$(PO$_4$)$_2$.3 H$_2$O structure type' described herein with peaks in the X-ray powder diffraction diagram at 10.96±0.05, 12.78±0.17, 14.96±0.13, 17.34±0.15, 18.98±0.18, 21.75±0.21, 22.07±0.11, 22.97±0.10, 25.93±0.25, 26.95±0.30, 27.56±0.10, 29.19±0.12, 29.84±0.21, 30.27±0.12, 34.86±0.21, 35.00±0.20, 35.33±0.30, 35.58±0.10, 35.73±0.12, 42.79±0.45, 43.37±0.45, 44.70±0.15 and 44.93±0.20 degrees two-theta, based on CuK$_\alpha$-radiation.

The manganese(Mn)-bearing phosphate according to the invention of the novel structure type preferably has an orthorhombic elementary cell with lattice parameters of 13.2+/−0.2; 8.6+/−0.2 and 8.1+/−0.2 Angström.

In a preferred embodiment of the process according to the invention precipitation of the manganese-bearing phosphate in stage e) is performed at a temperature in the region of 5 to 105° C., preferably in the region of 10 to 40° C. In that case the temperature can be kept constant by a suitable regulating unit in the region +/−5° C. around the desired point. Higher temperatures generally lead to more pronounced crystallinity in the products. Temperatures below 5° C. are admittedly possible but require unnecessary cooling. It is most advantageous for precipitation to be effected at room temperature or at the temperature which occurs due to the reaction. At temperatures above 105° C. the reaction mixture boils, which is undesirable and can be detrimental. Particularly preferably precipitation of the phosphate in stage c) is performed at a temperature in the region of 10 to 40° C. as this is the least expensive.

In a further preferred embodiment of the process according to the invention a carbon source is dispersed in the aqueous solution (I) prior to metered addition to the receiver solution (II) in stage d), wherein the carbon source includes elementary carbon or consists exclusively of elementary carbon and is preferably selected from graphite, expanded graphite, soots like carbon black or pine soot, carbon nanotubes (CNT), fullerenes, graphene, glass carbon (glass-like carbon), carbon fibres, activated carbon or mixtures thereof, or the aforementioned carbon source, besides elementary carbon, includes organic compounds, wherein the organic compounds are preferably selected from hydrocarbons, alcohols, aldehydes, carboxylic acids, tensides, oligomers, polymers, carbohydrates or mixtures thereof.

The addition of a carbon source to the aqueous solution (I) in the process according to the invention allows the production of phosphate-carbon composites, whereby an electrically conductive implementation of the material in itself or the products which can be produced from the material is possible, for example for the production of cathode materials for lithium-ion accumulators. The added amount and nature of the carbon source directly to the solution (I) makes it possible to freely adjust the resulting carbon content and thus the conductivity, within certain limits. Desirably the carbon source is added in the aqueous solution (I) in an amount of 1 to 10% by weight carbon, preferably 1.5 to 5% by weight carbon, particularly preferably 1.8 to 4% by weight carbon, with respect to the weight of the phosphate precipitated together with the carbon. An excessively high carbon content has the disadvantage that the maximum possible amount of active cathode material in a later use in lithium-ion batteries is reduced. With a carbon content below 1% by weight, an adequate conductivity increase is no longer achieved.

To increase the dispersion stability of the carbon component in the solution it may be advantageous, depending on the nature of the respective carbon source, to finely distribute the carbon source in the solution by the action of mechanical forces. Besides known methods of introducing high shearing forces, in particular the use of agitator ball mills is suitable for that purpose. Besides fine distribution of the carbon source the use of an agitator ball mill means that the mean particle size or agglomerate size of the source can also be modified. Thus for example the mean grain size of a graphite can be reduced to <300 nm. The resulting dispersions are highly stable and even after several days have scarcely any tendency to sedimentation of the solid, graphite, although it generally has initially hydrophobic material properties. The described treatment and an excess of free phosphate or phosphoric acid in the mixture provides that the surfaces of the graphite are modified and the solid in the dispersion is stabilised. Methods of hydrophilisation of carbon or graphite are also known, which can advantageously be used, for example partial oxidation of the surface. In addition the stability of the dispersion of the carbon source in the solution (I) can also advantageously be improved by the addition of surface-active substances.

In addition to other carbon sources or alternatively a polymer or biopolymer can also be added as the carbon source to the solution. Advantages are provided here by carbon sources which are soluble under the acid conditions prevailing in the solution (I). If the component should be insoluble distribution in the solution can also be improved by the action of shearing forces.

In a further preferred embodiment of the process according to the invention the aqueous medium, containing phosphoric acid, for the production of the aqueous solution (I) includes the phosphoric acid in a molar excess in relation to the sum of the molar amounts of the metal cations, to be introduced into the solution, of the oxidic metal compounds and the metals which are to be introduced in elementary form or as an alloy. Without an excess of phosphoric acid the redox process does not occur or takes place at such a low speed that the process is no longer attractive for a commercial application.

Desirably the concentration of the phosphoric acid in the aqueous solution (I) in stage a) is 5% to 85%, preferably 10% to 40%, particularly preferably 15% to 30%, quite particularly preferably 20% to 25%, with respect to the weight of the aqueous solution (I).

In a further preferred embodiment of the process according to the invention the receiver solution (II) contains the phosphate ions, calculated as P$_2$O$_5$, in a concentration in the region of 0.35 to 1.85 mol/L. A phosphate ion concentration below 0.35 mol/L P$_2$O$_5$ has the disadvantage that the reaction mixture is unnecessarily diluted and in the case of a commercial application an unnecessarily large volume of filtrate would have to be treated. A phosphate ion concentration above 1.85 mol/L P$_2$O$_5$ has the disadvantage that the reaction mixture cannot be optimally mixed because of a high solids proportion and resulting high viscosity. As a result that can involve local concentration gradients, which in turn can have a detrimental effect on formation of the desired crystal phase.

In a further preferred embodiment of the process according to the invention the reaction of the oxidic metal compounds with the elementary forms or alloys of the metals in stage a) is performed at a temperature in the range of 5° C. to 105° C., preferably in the range of 10° C. to 75° C., particularly preferably in the range of 20° C. to 50° C. At temperatures within the range according to the invention the reaction with various metal components can be implemented smoothly and at a satisfactory speed without involving oxidation phenomena with oxygen in the air.

In addition it is advantageous for the reaction of the oxidic metal compounds with the elementary forms or alloys of the metals in stage a) to be performed with intensive thorough mixing to achieve a uniform reaction and to avoid local over-concentrations within the reaction solution. That also applies to the subsequent precipitation stage.

Desirably the reaction of the oxidic metal compounds with the elementary forms or alloys of the metals in stage a) is performed for a period of 1 min to 240 min, preferably 5 min to 120 min, particularly preferably 30 min to 90 min. The required reaction period for a sufficiently complete reaction depends on the reactants and the reaction conditions and can be easily determined by the man skilled in the art by a few simple experiments. With an excessively short reaction time the reaction will generally not be sufficiently complete and will involve too many unreacted starting substances. The reaction time however should also not be too long as the process is then less economical. The aim is to achieve a complete reaction to acquire a defined metal composition. As described above the concentration of individual metals in the solution can possibly be adjusted by the addition of suitable metal salts. That however signifies additional complication and expenditure and increases the cost of the procedure as well as the risk of non-tolerable anion contamination.

The invention also includes a manganese(Mn)-bearing monometal phosphate of the type $Mn_3(PO_4)_2 \cdot 3H_2O$ or mixed-metal phosphate of the type $(Mn_x, Met_y)_3(PO_4)_2 \cdot 3H_2O$, wherein x+y=1 and Met represents one or more metals selected from Fe, Co, Ni, Sc, Ti, V, Cr, Cu, Zn, Be, Mg, Ca, Sr, Ba, Al, Zr, Hf, Re, Ru, La, Ce, Pr, Nd, Sm, Eu, Gd, Tb, Dy, Ho, Er, Tm, Yb and Lu, wherein in the X-ray powder diffraction diagram the phosphate has peaks at 10.96±0.05, 12.78±0.17, 14.96±0.13, 17.34±0.15, 18.98±0.18, 21.75±0.21, 22.07±0.11, 22.97±0.10, 25.93±0.25, 26.95±0.30, 27.56±0.10, 29.19±0.12, 29.84±0.21, 30.27±0.12, 34.86±0.21, 35.00±0.20, 35.33±0.30, 35.58±0.10, 35.73±0.12, 42.79±0.45, 43.37±0.45, 44.70±0.15 and 44.93±0.20 degrees two-theta, based on $CuK_\alpha$-radiation, which is or can be produced in accordance with the process according to the invention described herein.

The invention also includes the use of the phosphate according to the invention for the production of lithiated (Li-bearing) cathode material for Li-ion accumulators, for example in accordance with processes described in the literature. The use of the phosphate according to the invention as a precursor for production of lithiated cathode material has the advantage over the use of the methods known for that purpose that, in the phosphate according to the invention, the various desired metal cations are already present in ideally isotropically distributed form in a high-purity precursor which can be characterised in well-defined fashion using simple known methods, in respect of its crystal phase, composition and morphology. The nanoscale platelet form, which is preferred according to the invention, of the primary crystallites, ensures in that respect the shortest possible diffusion paths and diffusion times in the lithiation operation by way of simple and inexpensive calcination processes. The already existing ideally isotropic distribution of the metal ions in that case also reduces the necessary calcination temperatures and calcination times as no metal ion diffusion beyond grain boundaries is necessary. The defined crystallite structure ensures clearly defined and reproducible reaction paths in the calcination operation and in the production of cathode materials. The complication and expenditure involved in precise production of precursor mixtures is markedly reduced in comparison with known methods as the essential components are already present in a defined compound. The high purity of the phosphate according to the invention, in particular the very substantial absence or very low contents of anionic impurities like sulphates, nitrates, chlorides and so forth have an effect in a later battery application due to a markedly higher cycle resistance and service life, which increases the economy of the lithium-ion batteries and permits applications for example in electric vehicles.

The invention further concerns a lithiated (Li-bearing) cathode material for Li-ion accumulators, produced using manganese-bearing phosphate according to the invention.

The invention further concerns an Li-ion accumulator containing the lithiated (Li-bearing) cathode material according to the invention.

EXAMPLE 1

A phosphoric-acid solution (I) was produced from 80 g of 75% $H_3PO_4$ and 160 g of deionised water. 14.3 g of $Mn_3O_4$ and 3.5 g of Fe were added to that solution (I). The solution (I) was agitated for 90 minutes at room temperature and then filtered to remove from the solution residues which possibly remain.

A basic solution was also produced from 40 g of NaOH and 1000 g of deionised water. 25 g of $H_3PO_4$ with 100 g of water was placed in a reaction vessel and neutralised with the basic solution to a pH-value of 7, acquiring the receiver solution (II). The phosphoric-acid $Me^{2+}$-solution (I) and the basic solution were meteredly added to the neutralised receiver solution (II) at the same time with agitation so that the pH-value of the receiver solution (II) was always kept between 6.5 and 7. After termination of the metered addition the solution was agitated for a further 5 minutes. The precipitated solid was then sucked away by means of a Nutsche filter and washed with deionised water. The filter cake was dried at 120° C. in a circulating air drying cabinet.

EXAMPLE 2

A phosphoric-acid solution (I) was produced from 230 g of 75% $H_3PO_4$ and 460 g of deionised water. 8.9 g of $MnO_2$ as well as 30.1 g of $Mn_3O_4$ and 13.1 g of Fe were added to that solution (I). The solution (I) was agitated for 60 minutes at room temperature and then filtered to remove from the solution residues which possibly remain.

A basic solution was also produced from 120 g of NaOH and 3000 g of deionised water. 25 g of $H_3PO_4$ with 100 g of water was placed in a reaction vessel and neutralised with the basic solution to a pH-value of 7, acquiring the receiver solution (II). The phosphoric-acid $Me^{2+}$-solution (I) and the basic solution were meteredly added to the neutralised receiver solution (II) at the same time with agitation so that the pH-value of the receiver solution (II) was always kept between 6.5 and 7. After termination of the metered addition the solution was agitated for a further 5 minutes. The precipitated solid was then sucked away by means of a Nutsche filter and washed with deionised water. The filter cake was dried at 90° C. in a circulating air drying cabinet.

EXAMPLE 3

A phosphoric-acid solution (I) was produced from 80 g of 75% $H_3PO_4$ and 160 g of deionised water. 14.3 g of $Mn_3O_4$ and 3.8 g of Co were added to that solution (I). The solution (I) was agitated for 60 minutes at 60° C. and then filtered to remove from the solution residues which possibly remain.

A basic solution was also produced from 40.4 g of NaOH and 229 g of water. 25 g of $H_3PO_4$ with 100 g of water was placed in a reaction vessel and neutralised with the basic solution to a pH-value of 7, acquiring the receiver solution (II). The phosphoric-acid $Me^{2+}$-solution (I) and the basic solution were meteredly added at the same time with agitation so that the pH-value of the receiver solution (II) was always kept between 6.5 and 7. After termination of the metered addition the solution was agitated for a further 5 minutes. The precipitated solid was then sucked away by means of a Nutsche filter and washed with deionised water. The filter cake was dried at 70° C. in a circulating air drying cabinet.

EXAMPLE 4

A phosphoric-acid solution (I) was produced from 80 g of 75% $H_3PO_4$ and 160 g of deionised water. 14.1 g of $Mn_3O_4$ and 4.5 g of Mn were added to that solution (I). The solution (I) was agitated for 90 minutes at 20° C. and then filtered to remove from the solution residues which possibly remain.

A basic solution was also produced from 17.6 g of NaOH and 158.7 g of water. 10 g of $H_3PO_4$ with 100 g of water was placed in a reaction vessel and neutralised with the basic solution to a pH-value of 7, acquiring the receiver solution (II). The phosphoric-acid $Me^{2+}$-solution (I) and the basic solution were meteredly added to the neutralised receiver solution (II) at the same time with agitation so that the pH-value of the receiver solution (II) was always kept between 6.5 and 7. After termination of the metered addition the solution was agitated for a further 5 minutes. The precipitated solid was then sucked away by means of a Nutsche filter and washed with deionised water. The filter cake was dried at 80° C. in a circulating air drying cabinet.

EXAMPLE 5

A phosphoric-acid solution (I) was produced from 80 g of 75% $H_3PO_4$ and 160 g of deionised water. 14.3 g of $Mn_3O_4$ and 3.5 g of Fe were added to that solution (I). The solution (I) was agitated for 90 minutes at room temperature and then 17.7 g of $CoSO_4.6H_2O$ dissolved in 20 g of water was added. Then the resulting solution was filtered to remove from the solution residues which possibly remain.

A basic solution was also produced from 40 g of NaOH and 1000 g of water. 25 g of $H_3PO_4$ with 100 g of water was placed in a reaction vessel and neutralised with the basic solution to a pH-value of 7, acquiring the receiver solution (II). The phosphoric-acid $Me^{2+}$-solution (I) and the basic solution were meteredly added to the neutralised receiver solution (II) at the same time with agitation so that the pH-value of the receiver solution (II) was always kept between 6.5 and 7. After termination of the metered addition the solution was agitated for a further 5 minutes. The precipitated solid was then sucked away by means of a Nutsche filter and washed with deionised water. The filter cake was dried at 80° C. in a circulating air drying cabinet.

EXAMPLE 6

A phosphoric-acid solution (I) was produced from 80 g of 75% $H_3PO_4$ and 160 g of deionised water. 14.3 g of $Mn_3O_4$ and 3.5 g of Fe were added to that solution (I). The solution (I) was agitated for 90 minutes at 60° C. and then 2.6 of Mg(acetate)$_2$.$6H_2O$ dissolved in 20 g of water was added. Then the resulting solution was filtered to remove from the solution residues which possibly remain.

A basic solution was also produced from 50 g of NaOH and 450 g of water. 10 g of $H_3PO_4$ with 100 g of water was placed in a reaction vessel and neutralised with the basic solution to a pH-value of 7, acquiring the receiver solution (II). The phosphoric-acid $Me^{2+}$-solution (I) and the basic solution were meteredly added to the neutralised receiver solution (II) at the same time with agitation so that the pH-value of the receiver solution (II) was always kept between 6.5 and 7. After termination of the metered addition the solution was agitated for a further 5 minutes. The precipitated solid was then sucked away by means of a Nutsche filter and washed with deionised water. The filter cake was dried at 80° C. in a circulating air drying cabinet.

EXAMPLE 7

A phosphoric-acid solution (I) was produced from 80 g of 75% $H_3PO_4$ and 160 g of deionised water. 14.3 g of $Mn_3O_4$ and 2.2 g of Fe as well as 1.5 g of Co were added to that solution (I). The solution (I) was agitated for 90 minutes at room temperature and then filtered to remove from the solution residues which possibly remain.

A basic solution was also produced from 40 g of NaOH and 1000 g of deionised water. 25 g of $H_3PO_4$ with 100 g of water was placed in a reaction vessel and neutralised with the basic solution to a pH-value of 7, acquiring the receiver solution (II). The phosphoric-acid $Me^{2+}$-solution (I) and the basic solution were meteredly added to the neutralised receiver solution (II) at the same time with agitation so that the pH-value of the receiver solution (II) was always kept between 6.5 and 7. After termination of the metered addition the solution was agitated for a further 5 minutes. The precipitated solid was then sucked away by means of a Nutsche filter and washed with deionised water. The filter cake was divided up and a respective part was dried at 60° C. and 120° C. respectively in the circulating air drying cabinet.

EXAMPLE 8

A phosphoric-acid solution (I) was produced from 80 g of 75% $H_3PO_4$ and 160 g of deionised water. 14.3 g of $Mn_3O_4$ and 2.2 g of Fe as well as 1.5 g of Co were added to that solution (I). The solution (I) was agitated for 90 minutes at room temperature and then filtered to remove from the solution residues which possibly remain. Then 2.6 g of Mg(acetate).$6H_2O$ dissolved in 20 g of water was mixed with that solution.

A basic solution was also produced from 40 g of NaOH and 1000 g of deionised water. 25 g of $H_3PO_4$ with 100 g of water was placed in a reaction vessel and neutralised with the basic solution to a pH-value of 7, acquiring the receiver solution (II). The phosphoric-acid $Me^{2+}$-solution (I) and the basic solution were meteredly added to the neutralised receiver solution (II) at the same time with agitation so that the pH-value of the receiver solution (II) was always kept between 6.5 and 7. After termination of the metered addition the solution was agitated for a further 5 minutes. The precipitated solid was then sucked away by means of a Nutsche filter and washed with deionised water. The filter cake was divided up and a respective part was dried at 60° C. and 120° C. respectively in the circulating air drying cabinet.

EXAMPLE 9

A phosphoric-acid solution (I) was produced from 1090 g of 75% $H_3PO_4$ and 2380 g of deionised water. 209 g of $Mn_3O_4$ and 51 g of Fe were added to that solution (I). The solution (I) was agitated for 90 minutes at room temperature and then there was added to 100 g of that solution 1.94 g of $Al_2(SO_4)_3 \cdot 18H_2O$ dissolved in 20 ml of water followed by filtration to remove from the solution residues which possibly remain.

A basic solution was also produced from 50 g of NaOH and 450 g of water. 10 g of $H_3PO_4$ with 100 g of water was placed in a reaction vessel and neutralised with the basic solution to a pH-value of 7, acquiring the receiver solution (II). The phosphoric-acid $Me^{2+}$-solution (I) and the basic solution were meteredly added to the neutralised receiver solution (II) at the same time with agitation so that the pH-value of the receiver solution (II) was always kept between 6.5 and 7. After termination of the metered addition the solution was agitated for a further 5 minutes. The precipitated solid was then sucked away by means of a Nutsche filter and washed with deionised water. The filter cake was dried at 80° C. in a circulating air drying cabinet.

EXAMPLE 10

A phosphoric-acid solution (I) was produced from 1090 g of 75% $H_3PO_4$ and 2380 g of deionised water. 209 g of $Mn_3O_4$ and 51 g of Fe were added to that solution (I). The solution (I) was agitated for 90 minutes at room temperature and then there was added to 100 g of that solution 0.65 g of $CuCO_3 \cdot Cu(OH)_2 \cdot 0.5H_2O$ dissolved in 20 ml of dilute HCl followed by filtration to remove from the solution residues which possibly remain.

A basic solution was also produced from 50 g of NaOH and 450 g of water. 10 g of $H_3PO_4$ with 100 g of water was placed in a reaction vessel and neutralised with the basic solution to a pH-value of 7, acquiring the receiver solution (II). The phosphoric-acid $Me^{2+}$-solution (I) and the basic solution were meteredly added to the neutralised receiver solution (II) at the same time with agitation so that the pH-value of the receiver solution (II) was always kept between 6.5 and 7. After termination of the metered addition the solution was agitated for a further 5 minutes. The precipitated solid was then sucked away by means of a Nutsche filter and washed with deionised water. The filter cake was dried at 80° C. in a circulating air drying cabinet.

EXAMPLE 11

A phosphoric-acid solution (I) was produced from 1090 g of 75% $H_3PO_4$ and 2380 g of deionised water. 209 g of $Mn_3O_4$ and 51 g of Fe were added to that solution (I). The solution (I) was agitated for 90 minutes at room temperature and then there was added to 100 g of that solution 1.09 g of $LaCl_3 \cdot 7H_2O$ dissolved in 20 ml of water followed by filtration to remove from the solution residues which possibly remain.

A basic solution was also produced from 50 g of NaOH and 450 g of water. 10 g of $H_3PO_4$ with 100 g of water was placed in a reaction vessel and neutralised with the basic solution to a pH-value of 7, acquiring the receiver solution (II). The phosphoric-acid $Me^{2+}$-solution (I) and the basic solution were meteredly added to the neutralised receiver solution (II) at the same time with agitation so that the pH-value of the receiver solution (II) was always kept between 6.5 and 7. After termination of the metered addition the solution was agitated for a further 5 minutes. The precipitated solid was then sucked away by means of a Nutsche filter and washed with deionised water. The filter cake was dried at 80° C. in a circulating air drying cabinet.

EXAMPLE 12

A phosphoric-acid solution (I) was produced from 1090 g of 75% $H_3PO_4$ and 2380 g of deionised water. 209 g of $Mn_3O_4$ and 51 g of Fe were added to that solution (I). The solution (I) was agitated for 90 minutes at room temperature and then there was added to 100 g of that solution 1.12 g of $EuCl_3 \cdot 7H_2O$ dissolved in 20 ml of water followed by filtration to remove from the solution residues which possibly remain.

A basic solution was also produced from 50 g of NaOH and 450 g of water. 10 g of $H_3PO_4$ with 100 g of water was placed in a reaction vessel and neutralised with the basic solution to a pH-value of 7, acquiring the receiver solution (II). The phosphoric-acid $Me^{2+}$-solution (I) and the basic solution were meteredly added at the same time with agitation so that the pH-value of the receiver solution (II) was always kept between 6.5 and 7. After termination of the metered addition the solution was agitated for a further 5 minutes. The precipitated solid was then sucked away by means of a Nutsche filter and washed with deionised water. The filter cake was dried at 80° C. in a circulating air drying cabinet.

EXAMPLE 13

A phosphoric-acid solution (I) was produced from 1090 g of 75% $H_3PO_4$ and 2380 g of deionised water. 209 g of $Mn_3O_4$ and 51 g of Fe were added to that solution (I). The solution (I) was agitated for 90 minutes at room temperature and then there was added to 100 g of that solution 0.66 g of $SnCl_2 \cdot 2H_2O$ dissolved in 20 ml of dilute HCl followed by filtration to remove from the solution residues which possibly remain.

A basic solution was also produced from 50 g of NaOH and 450 g of water. 10 g of $H_3PO_4$ with 100 g of water was placed in a reaction vessel and neutralised with the basic solution to a pH-value of 7, acquiring the receiver solution (II). The phosphoric-acid $Me^{2+}$-solution (I) and the basic solution were meteredly added to the neutralised receiver solution (II) at the same time with agitation so that the pH-value of the receiver solution (II) was always kept between 6.5 and 7. After termination of the metered addition the solution was agitated for a further 5 minutes. The precipitated solid was then sucked away by means of a Nutsche filter and washed with deionised water. The filter cake was dried at 80° C. in a circulating air drying cabinet.

EXAMPLE 14

A phosphoric-acid solution (I) was produced from 1090 g of 75% $H_3PO_4$ and 2380 g of deionised water. 209 g of $Mn_3O_4$ and 51 g of Fe were added to that solution (I). The solution (I) was agitated for 90 minutes at room temperature and then there was added to 100 g of that solution 0.95 g of $ZrOCl_2$ dissolved in 20 ml of dilute HCl followed by filtration to remove from the solution residues which possibly remain.

A basic solution was also produced from 50 g of NaOH and 450 g of water. 10 g of $H_3PO_4$ with 100 g of water was placed in a reaction vessel and neutralised with the basic solution to a pH-value of 7, acquiring the receiver solution (II). The phosphoric-acid Me²⁺-solution (I) and the basic solution were meteredly added to the neutralised receiver solution (II) at the same time with agitation so that the pH-value of the receiver solution (II) was always kept between 6.5 and 7. After termination of the metered addition the solution was agitated for a further 5 minutes. The precipitated solid was then sucked away by means of a Nutsche filter and washed with deionised water. The filter cake was dried at 80° C. in a circulating air drying cabinet.

EXAMPLE 15

A phosphoric-acid solution (I) was produced from 1090 g of 75% $H_3PO_4$ and 2380 g of deionised water. 209 g of $Mn_3O_4$ and 51 g of Fe were added to that solution (I). The solution (I) was agitated for 90 minutes at room temperature and then there was added to 100 g of that solution 0.33 g of $CaCl_2$ dissolved in 20 ml of dilute HCl followed by filtration to remove from the solution residues which possibly remain.

A basic solution was also produced from 50 g of NaOH and 450 g of water. 10 g of $H_3PO_4$ with 100 g of water was placed in a reaction vessel and neutralised with the basic solution to a pH-value of 7, acquiring the receiver solution (II). The phosphoric-acid Me²⁺-solution (I) and the basic solution were meteredly added to the neutralised receiver solution (II) at the same time with agitation so that the pH-value of the receiver solution (II) was always kept between 6.5 and 7. After termination of the metered addition the solution was agitated for a further 5 minutes. The precipitated solid was then sucked away by means of a Nutsche filter and washed with deionised water. The filter cake was dried at 80° C. in a circulating air drying cabinet.

EXAMPLE 16

Comparison

A phosphoric-acid solution (I) was produced from 80 g of 75% $H_3PO_4$ and 160 g of deionised water. 14.1 g of $Fe_3O_4$ and 3.5 g of Fe were added to that solution (I). The solution (I) was agitated for 60 minutes at 60° C. and then 33.1 g of $NiSO_4.6H_2O$ dissolved in 100 g of water was added. The resulting solution was filtered to remove from the solution residues which possibly remain.

A basic solution was also produced from 50 g of NaOH and 500 g of water. 10 g of $H_3PO_4$ with 100 g of water was placed in a reaction vessel and neutralised with the basic solution to a pH-value of 7, acquiring the receiver solution (II). The phosphoric-acid Me²⁺-solution (I) and the basic solution were meteredly added to the neutralised receiver solution (II) at the same time with agitation so that the pH-value of the receiver solution (II) was always kept between 6.5 and 7. After termination of the metered addition the solution was agitated for a further 5 minutes. The precipitated solid was then sucked away by means of a Nutsche filter and washed with deionised water. The filter cake was dried at 100° C. in a circulating air drying cabinet.

EXAMPLE 17

Comparison

A phosphoric-acid solution (I) was produced from 80 g of 75% $H_3PO_4$ and 160 g of deionised water. 14.1 g of $Fe_3O_4$ and 3.8 g of Co were added to that solution (I). The solution (I) was agitated for 60 minutes at 60° C. and then filtered to remove from the solution residues which possibly remain.

A basic solution was also produced from 50 g of NaOH and 500 g of water. 10 g of $H_3PO_4$ with 100 g of water was placed in a reaction vessel and neutralised with the basic solution to a pH-value of 7, acquiring the receiver solution (II). The phosphoric-acid Me²⁺-solution (I) and the basic solution were meteredly added to the neutralised receiver solution (II) at the same time with agitation so that the pH-value of the receiver solution (II) was always kept between 6.5 and 7. After termination of the metered addition the solution was agitated for a further 5 minutes. The precipitated solid was then sucked away by means of a Nutsche filter and washed with deionised water. The filter cake was dried at 70° C. in a circulating air drying cabinet.

EXAMPLE 18

Comparison

A phosphoric-acid solution (I) was produced from 80 g of 75% $H_3PO_4$ and 160 g of deionised water. 14.4 g of $Co_3O_4$ and 3.8 g of Co were added to that solution (I). The solution (I) was agitated for 60 minutes at room temperature and then filtered to remove from the solution residues which possibly remain.

A basic solution was also produced from 41.9 g of NaOH and 376.8 g of water. 10 g of $H_3PO_4$ with 100 g of water was placed in a reaction vessel and neutralised with the basic solution to a pH-value of 7, acquiring the receiver solution (II). The phosphoric-acid Me²⁺-solution (I) and the basic solution were meteredly added to the neutralised receiver solution (II) at the same time with agitation so that the pH-value of the receiver solution (II) was always kept between 6.5 and 7. After termination of the metered addition the solution was agitated for a further 5 minutes. The precipitated solid was then sucked away by means of a Nutsche filter and washed with deionised water. The filter cake was dried at 80° C. in a circulating air drying cabinet.

EXAMPLE 19

Comparison

A phosphoric-acid solution (I) was produced from 80 g of 75% $H_3PO_4$ and 160 g of deionised water. 14.1 g of $Fe_3O_4$ and 3.5 g of Fe were added to that solution (I). The solution (I) was agitated for 60 minutes at 60° C. and then filtered to remove from the solution residues which possibly remain.

A basic solution was also produced from 17.6 g of NaOH and 158.7 g of water. 10 g of $H_3PO_4$ with 100 g of water was placed in a reaction vessel and neutralised with the basic solution to a pH-value of 7, acquiring the receiver solution (II). The phosphoric-acid Me²⁺-solution (I) and the basic solution were meteredly added to the neutralised receiver solution (II) at the same time with agitation so that the pH-value of the receiver solution (II) was always kept between 6.5 and 7. After termination of the metered addition the solution was agitated for a further 5 minutes. The precipitated solid was then sucked away by means of a Nutsche filter and washed with deionised water. The filter cake was dried at 80° C. in a circulating air drying cabinet.

EXAMPLE 20

Comparison

A phosphoric-acid solution (I) was produced from 80 g of 75% $H_3PO_4$ and 160 g of deionised water. 14.4 g of $Co_3O_4$ and 3.5 g of Fe were added to that solution (I). The solution (I) was agitated for 60 minutes at room temperature and then filtered to remove from the solution residues which possibly remain.

A basic solution was also produced from 41.9 g of NaOH and 376.8 g of water. 10 g of $H_3PO_4$ with 100 g of water was placed in a reaction vessel and neutralised with the basic solution to a pH-value of 7, acquiring the receiver solution (II). The phosphoric-acid $Me^{2+}$-solution (I) and the basic solution were meteredly added to the neutralised receiver solution (II) at the same time with agitation so that the pH-value of the receiver solution (II) was always kept between 6.5 and 7. After termination of the metered addition the solution was agitated for a further 5 minutes. The precipitated solid was then sucked away by means of a Nutsche filter and washed with deionised water. The filter cake was dried at 80° C. in a circulating air drying cabinet.

Table 1 combines Examples 1 to 20 and the results of the analytical investigations of the respective products.

Examples 1 to 15 show that in accordance with the process of the invention manganese(Mn)-bearing monometal or multimetal phosphates of the '$Mn_3(PO_4)_2.3H_2O$ structure type' are obtained. The ratio of metal to phosphate ($PO_4$) in the products obtained is about 3 to 2. The metals manganese (Mn) and if contained the metals Fe, Mn, Ni and Co are thus present in the products in their divalent form. It is conceivable that there are very small amounts of those metals in another oxidation stage, for example Fe can oxidise at the particle surfaces to a slight degree, for example in the drying operation and at high temperatures. Such slight deviations from the divalent form are to be viewed in accordance with the present invention as inevitable impurities, whereby this does not constitute a departure from the scope of protection of the invention. The doping metals can be present in the form of their stable or known oxidation stages.

Examples (Comparative Examples) 16 to 20 show that in accordance with the comparable process but without the addition of elementary manganese (Mn) or manganese-bearing oxidic compounds, monometal or mixed-metal phosphates are obtained, which do not have the '$Mn_3(PO_4)_2.3H_2O$ structure type'. The products of Examples 16 to 20 could all be associated in X-ray analysis with the vivanite crystal structure type [$Fe_3(PO_4)_2.8H_2O$] or dehydration stages thereof.

The drying temperature has an influence on the content of bound water of crystallisation. The higher the drying temperature and the longer the drying times were, the correspondingly less was the water of crystallisation content. A reduced water partial pressure accelerated drying.

The products of Examples 1 to 15 according to the invention all exhibit the same analytical X-ray diffraction image in the X-ray powder diffraction diagram with peaks at 10.96 15±0.05, 12.78±0.17, 14.96±0.13, 17.34±0.15, 18.98±0.18, 21.75±0.21, 22.07±0.11, 22.97±0.10, 25.93±0.25, 26.95±0.30, 27.56±0.10, 29.19±0.12, 29.84±0.21, 30.27±0.12, 34.86±0.21, 35.00±0.20, 35.33±0.30, 35.58±0.10, 35.73±0.12, 42.79±0.45, 43.37±0.45, 44.70±0.15 and 44.93±0.20 degrees two-theta, based on $CuK_\alpha$-radiation. Only the peak positions, in dependence on the nature and concentration of the various metals in the multimetal phosphates, have slight displacements which are caused by different ion radii and a varying degree of occupancy of the cation sites in the crystal lattice of the elementary cell.

The powder X-rayographic analyses and electron diffraction analyses in a transmission electron microscope, for the products of Examples 1 to 15, exhibit an orthorhombic elementary cell with axis lengths of 13.2+/−0.2; 8.6+/−0.2 and 8.1+/−0.2 Angstrom.

The X-ray powder diffraction diagrams obtained for the products according to the invention with the above-mentioned peaks and the elementary cells determined for the products with the specified parameters which vary slightly depending on the respective composition of the metal components within the specified ranges are hitherto not known for compounds of the composition $Mn_3(PO_4)_2.3H_2O$ and their (pseudo)binary, (pseudo)ternary or (pseudo(quaternary) variants in the pertinent data banks. A novel '$Mn_3(PO_4)_2.3H_2O$ structure type' was identified for the products according to the invention. The structure is observed if the product according to the invention contains exclusively Mn as metal (see Example 3) but also if further metals are included.

The data bank of the ICDD (International Centre for Diffraction Data), under the number 003-0426, has a PDF entry (Powder Diffraction File) for a compound of the type $Mn_3(PO_4)_2.3H_2O$, but there are no conformities in respect of position, number and intensity of the described reflections between the data stored there and the values determined experimentally here for the products according to the invention of the '$Mn_3(PO_4)_2.3H_2O$ structure type'. In addition, no crystallographic data which describe more fully the crystal structure are stored for the compound described in the ICDD data bank. The products according to the invention of the '$Mn_3(PO_4)_2.3H_2O$ structure type' specified herein were therefore hitherto not described.

The products according to the invention involve predominantly a platelet-form morphology of the primary crystallites, wherein the platelet thickness in a scanning electron microscope can be determined in an order of magnitude of about 10 to 50 nm.

The platelet-form morphology of the products produced allows in principle dense packing of the crystallites, that is to say the platelets can be stacked with a smaller void volume than is the case with round spherical particles. Aggregates or agglomerates of that material, which are constructed layer-like, can be easily converted into dispersions of the primary particles by common methods under the effect of shearing forces.

The small thickness of the crystal platelets of the product according to the invention ensures a high reaction speed in the lithiation of the phosphates to give active cathode materials as the lithium ions only have to cover short diffusion paths in the reaction. That also leads to improved conductivity of the finished cathode material as the diffusion distances and times of the Li-ions can be markedly reduced in comparison with a conventional material.

TABLE 1

| | Employed elementary metals, oxidic metal compounds and salts | | | | Analytical results | | | | | |
|---|---|---|---|---|---|---|---|---|---|---|
| Ex. | M1 | M2 | M3 | M4 | T* | M1 [% wt] | M2 [% wt] | M3 [% wt] | M4 [% wt] | Crystal structure | Morphology |
| 1 | Fe | Mn3O4 | — | — | 120 | 24.4 | 75.6 | — | — | Mn3(PO4)2•3H2O | Platelet |
| 2 | Fe | MnO2 | Mn3O4 | — | 120 | 31.8 | 68.2 | — | — | Mn3(PO4)2•3H2O | Platelet |
| 3 | Co | Mn3O4 | — | — | 70 | 37.3 | 62.7 | — | — | Mn3(PO4)2•3H2O | Platelet |
| 4 | Mn | Mn3O4 | | | 80 | 100.0 | — | — | — | Mn3(PO4)2•3H2O | Platelet |
| 5 | Fe | Mn3O4 | CoSO4 | | 80 | 19.4 | 58.2 | 22.4 | — | Mn3(PO4)2•3H2O | Platelet |

TABLE 1-continued

| | Employed elementary metals, oxidic metal compounds and salts | | | | Analytical results | | | | | |
|---|---|---|---|---|---|---|---|---|---|---|
| | | | | | M1 | M2 | M3 | M4 | | |
| Ex. | M1 | M2 | M3 | M4 | T* | [% wt] | [% wt] | [% wt] | [% wt] | Crystal structure | Morphology |
| 6 | Fe | Mn3O4 | MgOAc2 | — | 80 | 25.2 | 72.9 | 1.8 | — | Mn3(PO4)2•3H2O | Platelet |
| 7 | Fe | Co | Mn3O4 | — | 80 | 14.6 | 12.4 | 73.0 | — | Mn3(PO4)2•3H2O | n.k. |
| 8 | Fe | Co | Mn3O4 | MgOAc2 | 80 | 13.7 | 12.4 | 73.0 | 1.0 | Mn3(PO4)2•3H2O | n.k. |
| 9 | Fe | Mn3O4 | Al2(SO4)3 | — | 80 | 24.6 | 72.7 | 2.7 | — | Mn3(PO4)2•3H2O | n.k. |
| 10 | Fe | Mn3O4 | CuCO3•Cu(OH)2 | — | 80 | 24.3 | 70.8 | 5.0 | — | Mn3(PO4)2•3H2O | n.k. |
| 11 | Fe | Mn3O4 | LaCl3 | — | 80 | 23.8 | 68.1 | 8.1 | — | Mn3(PO4)2•3H2O | n.k. |
| 12 | Fe | Mn3O4 | EuCl3 | — | 80 | 23.6 | 69.5 | 6.9 | — | Mn3(PO4)2•3H2O | n.k. |
| 13 | Fe | Mn3O4 | SnCl2 | — | 80 | 24.0 | 70.2 | 5.8 | — | Mn3(PO4)2•3H2O | n.k. |
| 14 | Fe | Mn3O4 | ZrOCl2 | — | 80 | 24.2 | 70.6 | 5.2 | — | Mn3(PO4)2•3H2O | n.k. |
| 15 | Fe | Mn3O4 | CaCl2 | — | 80 | 25.1 | 73.0 | 1.9 | — | Mn3(PO4)2•3H2O | n.k. |
| 16 | Fe | Fe3O4 | NiSO4 | — | 100 | 39.2 | — | 60.8 | — | Vivianite type | Platelet + Spherical. |
| 17 | Co | Fe3O4 | | — | 70 | 25.7 | 74.3 | | — | Vivianite type | Platelet |
| 18 | Co | Co3O4 | | — | 80 | 100.0 | — | | — | Vivianite type | Platelet |
| 19 | Fe | Fe3O4 | | — | 80 | 100.0 | | | — | Vivianite type | Platelet |
| 20 | Fe | Co3O4 | | — | 80 | 11.2 | 88.8 | | — | Vivianite type | Platelet |

T* = Drying temperature;
"vac" = Vacuum;
M1, M2, M3 and M4 under "Analytical results" = % wt of the introduced metal, relative to the total amount of the introduced metals (— = with identical metals proportion of the metal already specified in the preceding column)

The invention claimed is:

1. A manganese (Mn)-bearing phosphate having an orthorhombic elementary cell with lattice parameters of 13.2+/−0.2; 8.6+/−0.2 and 8.1+/0.2 Angström, of the type $(Mn_x, Met_y)_3(PO_4)_2 \cdot 3H_2O$, wherein x+y=1, wherein the numerical ratio of Mn:(Mn+Met) is ≥0.15, and wherein Met represents one or more metals selected from Fe, Co, Ni, Sc, Ti, V, Cr, Cu, Zn, Be, Mg, Ca, Sr, Ba, Al, Zr, Hf, Re, Ru, La, Ce, Pr, Nd, Sm, Eu, Gd, Tb, Dy, Ho, Er, Tm, Yb and Lu, and wherein an X-ray powder diffraction diagram of the phosphate has peaks at 10.96±0.05, 12.78±0.17, 14.96±0.13, 17.34±0.15, 18.98±0.18, 21.75±0.21, 22.07±0.11, 22.97±0.10, 25.93±0.25, 26.95±0.30, 27.56±0.10, 29.19±0.12, 29.84±0.21, 30.27±0.12, 34.86±0.21, 35.00±0.20, 35.33±0.30, 35.58±0.10, 35.73±0.12, 42.79±0.45, 43.37±0.45, 44.70±0.15 and 44.93±0.20 degrees two-theta, based on $CuK_\alpha$-radiation.

2. A manganese (Mn)-bearing phosphate according to claim 1 in the form of a carbon composite containing 1 to 10% by weight of carbon, preferably 1.5 to 5% by weight of carbon, particularly preferably 1.8 to 4% by weight of carbon, with respect to the total weight of phosphate and carbon.

3. A manganese (Mn)-bearing phosphate according to claim 1 wherein it has a platelet-shaped morphology with a platelet thickness in the region of 20 to 70 nm.

4. A manganese (Mn)-bearing phosphate according to claim 1 wherein it is a mixed-metal phosphate of the type $(Mn_xMet_y)_3(PO_4)_2 \cdot 3H_2O$ and the numerical ratio of Mn:(Mn+Met) is ≥0.15, preferably ≥0.4, particularly preferably ≥0.5.

5. A manganese (Mn)-bearing phosphate according to claim 1 wherein it is a mixed-metal phosphate of the type $(Mn_xMet_y)_3(PO_4)_2 \cdot 3H_2O$ and the numerical ratio of Mn:(Mn+Met) is ≥0.4.

6. A process for producing a manganese (Mn)-bearing phosphate having an orthorhombic elementary cell with lattice parameters of 13.2+/−0.2; 8.6+/−0.2 and 8.1+/−0.2 Angström, of the type $(Mn_x, Met_y)_3(PO_4)_2 \cdot aH_2O$, wherein x+y=1 where y is 0 to 0.5, and a=0 to 9, and wherein the numerical ratio of Mn:(Mn+Met) is ≥0.15 and wherein Met represents one or more metals selected from Fe, Co, Ni, Sc, Ti, V, Cr, Cu, Zn, Be, Mg, Ca, Sr, Ba, Al, Zr, Hf, Re, Ru, La, Ce, Pr, Nd, Sm, Eu, Gd, Tb, Dy, Ho, Er, Tm, Yb and Lu and wherein an X-ray powder diffraction diagram of the phosphate has peaks at 10.96±0.05, 12.78 ±0.17, 14.96±0.13, 17.34±0.15, 18.98±0.18, 21.75±0.21, 22.07±0.11, 22.97±0.10, 25.93 ±0.25, 26.95±0.30, 27.56±0.10, 29.19±0.12, 29.84±0.21, 30.27±0.12, 34.86±0.21, 35.00 ±0.20, 35.33±0.30, 35.58±0.10, 35.73±0.12, 42.79±0.45, 43.37±0.45, 44.70±0.15 and 44.93±0.20 degrees two-theta, based on $CuK_\alpha$-radiation, and wherein the process comprises:

a) producing an aqueous solution (I) that contains at least divalent manganese cations ($Mn^{2+}$) and optionally one or more of the metals Fe, Co and/or Ni as divalent cations, by introducing oxidic metal(II)-, metal(III)- and/or metal(IV) compounds or their mixtures or compounds with mixed oxide stages selected from hydroxides, oxides, oxide-hydroxides, oxide-hydrates, carbonates and hydroxide carbonates, of at least one of the metals Mn, Fe, Co and/or Ni together with the elementary forms or alloys of at least one of the metals Mn, Fe, Co and/or Ni into an aqueous medium containing phosphoric acid, and reacting the oxidic metal compounds with the elementary forms or alloys of the metals (in a redox reaction) to give the divalent metal ions, wherein at least one of the oxidic metal compounds and/or at least one of the elementary forms or alloys of metal includes manganese, b) separating solid substances from the phosphoric-acid aqueous solution (I), c) if the phosphate is a mixed-metal phosphate, adding at least one further metal Met to the aqueous solution (I) in the form of an aqueous solution or in the form of a solid substance in the form of a salt, in addition to the metals introduced into the solution in stage a), d) producing a receiver solution (II) with a pH-value of 5 to 8 from an aqueous phosphoric acid solution by neutralisation with an aqueous alkali hydroxide solution or produced from an aqueous solution of one or more alkali phosphates, e) metering the aqueous solution (I) to the receiver solution (II) and at the same time metering a basic aqueous alkali hydroxide solution to the receiver solution (II) in such a way that the pH-value of the resulting reaction mixture is kept in the region of 5 to 8 to precipitate $(Mn_x, Met_y)_3(PO_4)_2 \cdot aH_2O$, and f) separating the precipitated phosphate from the reaction solution.

7. The process of claim 6 wherein the at least one further Met is in the form of compound selected from the group consisting of hydroxides, oxides, oxide-hydroxides, oxide-hydrates, carbonates, hydroxide carbonates, carboxylates, sulphates, chlorides and nitrates.

8. A process according to claim 6 wherein the precipitated phosphate separated from the reaction solution is dried to a hydrate stage $Mn_3(PO_4)_2 \cdot aH_2O$ or $(Mn_xMet_y)_3(PO_4)_2 \cdot aH_2O$ where a is 0, 3 or 7.

9. A process according to claim 6 wherein the manganese (Mn)-bearing phosphate is a mixed-metal phosphate which in addition to manganese (Mn) contains at least one further metal (Met) and contains not more than 7 different metals.

10. A process according to claim 6 wherein the manganese (Mn)-bearing phosphate, in relation to all contained metals, contains at least 40 atomic % of Mn.

11. A process according to claim 6 wherein precipitation of the manganese(Mn)-bearing phosphate in stage e) is performed at a temperature in the region of 10 to 40°C.

12. A process according to claim 6 wherein a carbon source is dispersed in the aqueous solution (I) prior to metered addition to the receiver solution (II) in stage e), wherein the carbon source is selected from the group consisting of graphite, expanded graphite, soot, carbon nanotubes (CNT), fullerenes, graphene, glass carbon (glass-like carbon), carbon fibres, activated carbon, hydrocarbons, alcohols, aldehydes, carboxylic acids, tensides, oligomers, polymers, carbohydrates and mixtures; provided that, the carbon source includes elemental carbon.

13. A process according to claim 12 wherein the carbon source is added to the aqueous solution (I) in an amount of 1.5 to 5% by weight carbon with respect to weight of the mixed-metal phosphate precipitated together with the carbon.

14. A process according to claim 6 wherein the aqueous medium containing phosphoric acid, for the production of the aqueous solution (I) includes the phosphoric acid in a molar excess in relation to the sum of the molar amounts of metal cations to be introduced into the solution, of the oxidic metal compounds and the metals which are to be introduced in elementary form or as an alloy.

15. A process according to claim 6 wherein the receiver solution (II) contains the phosphate ions, calculated as $P_2O_5$, in a concentration in the region of 0.35 to 1.85 mol/L.

16. A process according to claim 6 wherein the reaction of the oxidic metal compounds with the elementary forms or alloys of the metals in stage a) is performed at a temperature in the range 20°C to 50°C with intensive thorough mixing for a period of 5 min to 120 min.

17. A process according to claim 6 wherein the concentration of the phosphoric acid in the aqueous solution (I) in stage a) is 10% to 40 with respect to the weight of the aqueous solution (I).

18. Preparation of a lithiated cathode material for Li-ion accumulators employing manganese(Mn)-bearing phosphate according to claim 1.

19. A lithiated cathode material for Li-ion accumulators produced using manganese(Mn)-bearing phosphate according to one of claim 18.

20. A manganese(Mn)-bearing phosphate produced according to the process of claim 6.

* * * * *